(12) United States Patent
Chen

(10) Patent No.: US 7,858,690 B2
(45) Date of Patent: Dec. 28, 2010

(54) FUNCTIONAL COUPLING AGENTS AND POLYMERS PREPARED THEREWITH

(75) Inventor: Yaohong Chen, Akron, OH (US)

(73) Assignee: Bridgestone Corporation (JP)

( * ) Notice: Subject to any disclaimer, the term of this patent is extended or adjusted under 35 U.S.C. 154(b) by 322 days.

(21) Appl. No.: 11/973,234

(22) Filed: Oct. 5, 2007

(65) Prior Publication Data

US 2008/0097024 A1 Apr. 24, 2008

Related U.S. Application Data

(60) Provisional application No. 60/850,029, filed on Oct. 6, 2006.

(51) Int. Cl.
C08K 3/34 (2006.01)
C08G 77/00 (2006.01)
C08G 77/38 (2006.01)

(52) U.S. Cl. .......................... 524/492; 528/10; 528/33; 528/39

(58) Field of Classification Search ................. 556/400, 556/433–434, 450, 462; 524/14, 33, 492; 528/10, 33, 39
See application file for complete search history.

(56) References Cited

U.S. PATENT DOCUMENTS

| | | | | |
|---|---|---|---|---|
| 3,073,789 | A * | 1/1963 | Goldstein et al. ............ 524/265 |
| 3,288,879 | A * | 11/1966 | Safford ........................ 525/105 |
| 3,655,598 | A * | 4/1972 | Antonen et al. ............... 528/15 |
| 3,691,257 | A * | 9/1972 | Kendrick et al. .............. 525/90 |
| 3,842,111 | A | 10/1974 | Meyer-Simon et al. |
| 3,873,489 | A | 3/1975 | Thurn et al. |
| 3,928,490 | A * | 12/1975 | Hergenrother ............... 525/105 |
| 3,978,103 | A | 8/1976 | Meyer-Simon et al. |
| 3,997,581 | A | 12/1976 | Pletka et al. |
| 4,002,594 | A | 1/1977 | Fetterman |
| 4,618,650 | A * | 10/1986 | Halasa et al. ................ 525/105 |
| 4,770,968 | A * | 9/1988 | Georges et al. ........... 430/109.3 |
| 4,933,391 | A * | 6/1990 | Long et al. ................... 525/106 |
| 5,057,619 | A * | 10/1991 | Kumar et al. ................ 556/420 |
| 5,086,141 | A | 2/1992 | Georges ...................... 526/279 |
| 5,409,969 | A * | 4/1995 | Hamada ...................... 523/213 |
| 5,580,919 | A | 12/1996 | Agostini et al. |
| 5,583,245 | A | 12/1996 | Parker et al. |
| 5,663,396 | A | 9/1997 | Musleve et al. |
| 5,674,932 | A | 10/1997 | Agostini et al. |
| 5,684,171 | A | 11/1997 | Wideman et al. |
| 5,684,172 | A | 11/1997 | Wideman et al. |
| 5,696,197 | A | 12/1997 | Smith et al. |
| 5,811,479 | A * | 9/1998 | Labauze ...................... 524/188 |
| 6,013,718 | A * | 1/2000 | Cabioch et al. .............. 524/506 |
| 6,020,430 | A * | 2/2000 | Schwindeman et al. ..... 525/105 |
| 6,255,404 | B1 * | 7/2001 | Hogan et al. ............. 525/326.5 |
| 6,313,210 | B1 * | 11/2001 | Lin et al. ..................... 524/492 |
| 6,342,552 | B1 | 1/2002 | Hergenrother et al. |
| 6,344,521 | B1 * | 2/2002 | Schwindeman et al. ..... 525/105 |
| 6,525,118 | B2 | 2/2003 | Hergenrother et al. |
| 6,569,942 | B2 * | 5/2003 | Weydert et al. ............. 525/105 |
| 6,579,949 | B1 | 6/2003 | Hergenrother et al. |
| 6,590,017 | B1 | 7/2003 | Hergenrother et al. |
| 6,608,145 | B1 | 8/2003 | Lin et al. |
| 6,667,362 | B2 | 12/2003 | Robert et al. |
| 6,683,135 | B2 | 1/2004 | Cruse et al. |
| 6,783,897 | B2 * | 8/2004 | Kang et al. .................. 429/313 |
| 6,858,696 | B2 * | 2/2005 | Destarac et al. ............... 528/24 |
| 6,998,448 | B2 * | 2/2006 | Zanzig et al. ............. 525/333.2 |
| 2002/0137870 | A1 * | 9/2002 | Crivello ........................ 528/10 |
| 2004/0097633 | A1 * | 5/2004 | Robert et al. ................ 524/492 |
| 2005/0131189 | A1 * | 6/2005 | Salamone et al. ............. 528/25 |
| 2005/0176886 | A1 * | 8/2005 | Jang et al. ..................... 525/63 |
| 2006/0086450 | A1 | 4/2006 | Hogan et al. |
| 2006/0089447 | A1 * | 4/2006 | Robertson et al. ........... 524/493 |

FOREIGN PATENT DOCUMENTS

WO WO2004098542 A1 * 11/2004

OTHER PUBLICATIONS

M. Jang: J. V. Crivello, J. Polym. Sci. Plym. Chem., 41, 3056-3073 (2003).
J.V. Crivello, J.L. Lee, J. Polym. Sci. Polym. Chem., 28, 479-503 (1990).

* cited by examiner

*Primary Examiner*—Randy Gulakowski
*Assistant Examiner*—Robert Loewe
(74) *Attorney, Agent, or Firm*—Meredith E. Hooker; Arthur Reginelli

(57) ABSTRACT

A polymer including a functional group, where the polymer is defined by the formula

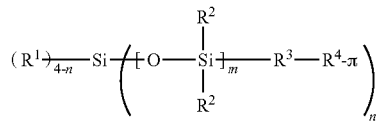

where $R^1$ is a monovalent organic group, each $R^2$ is independently a monovalent organic group, $R^3$ is a divalent organic group, $R^4$ is a bond, a divalent organic group, or a divalent organic group including a functional group, $\pi$ is a polymer chain, m is an integer from 1 to about 25, and n is an integer from 1 to 4.

24 Claims, No Drawings

FUNCTIONAL COUPLING AGENTS AND POLYMERS PREPARED THEREWITH

This application gains the benefit of U.S. Provisional Application No. 60/850,029 filed Oct. 6, 2006 which is incorporated herein by reference.

FIELD OF THE INVENTION

One or more embodiments of the present invention are directed toward functional coupling agents. One or more embodiments of the present invention are directed toward functional polymers and methods for making the functional polymers. Functional polymers of one or more embodiments are characterized by advantageous cold flow and processing properties, and they yield vulcanizates, particularly tire treads, that exhibit low rolling resistance and technologically useful wet traction.

BACKGROUND OF THE INVENTION

Synthetic polymers, particularly solution polymerized polymers made by anionic polymerization techniques, have been employed in the manufacture of tires. The handling of these polymers prior to tire manufacture can be difficult because the polymers tend to flow under ambient conditions. This flow has been referred to as cold flow.

To alleviate cold flow problems, the polymers can be coupled. For example, living polymers can be reacted with multi-valent compounds such as tin tetrachloride or silicon tetrachloride to provide coupled polymers that are less susceptible to cold flow. This reduction in the tendency to flow is believed to be caused by a viscosity increase that occurs when the polymers are coupled. While this increase in viscosity is advantageous for cold flow, it can be undesirable for processing. That is, highly viscous polymers can be difficult to mix with other ingredients that are often included in rubber formulations such as fillers.

Advantageously, certain coupling agents provide bonds to the polymer chains that are believed to break under mixing conditions. For example, the carbon-tin bond within polymers coupled with tin tetrachloride are believed to break during mixing as evidenced by a decrease in sheer viscosity at mixing conditions.

While polymer coupling has proven to be technologically useful, the coupling of the polymer results in lost opportunity for other advantageous reactions with the polymer live ends. As is known in the art, polymer live ends can be reacted with functionalizing agents that provide benefit to the rubber compositions. For example, living polymers have been reacted with compounds such as tributyltin chloride or 1,3-dimethyl-2-imidazolidinone to provide functional groups that have desirable impact in filled rubber vulcanizates. Indeed, functional groups deriving from reactions with these compounds are believed to reduce the rolling resistance of tire treads prepared with polymers bearing these functional groups.

Since these functional groups offer little or no cold flow reduction, coupling agents and functionalizing agents may be used together in an effort to achieve a desirable balance of properties. While this has proven to be technologically useful, drawbacks exist. Namely, neither maximum cold flow reduction nor maximum polymer functionalization can be achieved.

There is therefore a need for an advancement in this technology.

SUMMARY OF THE INVENTION

One or more embodiments of the present invention provide a polymer including a functional group, where the polymer is defined by the formula

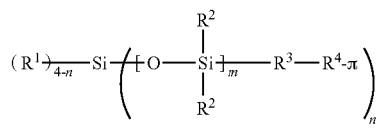

where $R^1$ is a monovalent organic group, each $R^2$ is independently a monovalent organic group, $R^3$ is a divalent organic group, $R^4$ is a bond, a divalent organic group, or a divalent organic group including a functional group, $\pi$ is a polymer chain, m is an integer from 1 to about 25, and n is an integer from 1 to 4.

One or more embodiments of the present invention also provides a method for forming a polymer including a functional group, the method comprising preparing a living polymer by employing anionic polymerization techniques, introducing the living polymer to a functionalizing agent and allowing the living polymer to react with the functionalizing agent, where the functionalizing agent is defined by the formula

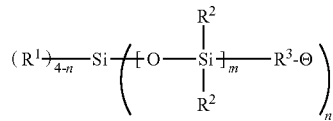

where $R^1$ is a monovalent organic group, each $R^2$ is independently a monovalent organic group, $R^3$ is a divalent organic group, $\Theta$ is a group that will react with a living polymer, m is an integer from 1 to about 25, and n is an integer from 1 to 4.

DETAILED DESCRIPTION OF ILLUSTRATIVE EMBODIMENTS

In one or more embodiments, the functional polymers of this invention may be prepared by reacting or terminating a living polymer with a functionalizing compound that may be defined by the formula

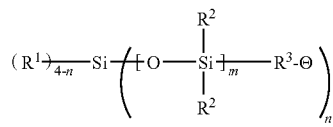

where $R^1$ is a monovalent organic group, each $R^2$ is independently a monovalent organic group, $R^3$ is a divalent organic group, $\Theta$ is a group that will react with a living polymer, m is an integer from 1 to about 25, and n is an integer from 1 to 4. In certain embodiments, m is an integer from 1 to about 12, in other embodiments from 1 to about 6, and in other embodiments from 1 to about 3. In these or other embodiments, n is an integer from 2 to 4, in other embodiments from 3 to 4, and in other embodiments 4. Depending on the functionality of the functionalizing compounds employed in practicing the present invention, those skilled in the art will appreciate that those compounds having more than one reactive functionality may serve to couple multiple living polymer chains. The term functionalizing agent or compound may nonetheless be employed to describe these compounds within this specification inasmuch as a functional group is attached to the polymer chains even in the case of coupling.

In one or more embodiments, the monovalent organic groups may include hydrocarbyl groups or substituted hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, boron, oxygen, silicon, sulfur, and phosphorus atoms. In one or more embodiments, the monovalent organic groups will not react with a living anionic polymer.

In one or more embodiments, the divalent organic group may include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. Substituted hydrocarbylene group includes a hydrocarbylene group in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms. In one or more embodiments, the divalent organic group will not react with a living anionic polymer.

In one or more embodiments, Θ includes a leaving group or an addition group. In one or more embodiments, leaving groups include those substituents that can be displaced by a nucleophilic compound. In one or more embodiments, leaving groups include those substituents that will react or associate with the counter-cation of a living polymer (e.g., $Li^+$) and thereby form a stable or neutral compound. Exemplary leaving groups, or groups that include leaving groups, include halides, thioalkoxides, alkoxides, dialkylamines, imides, and mixtures thereof. Examples of alkoxide groups include methoxy and ethoxy groups. Leaving groups include cyclic leaving groups, which can be self-contained (i.e., the group opens). In one or more embodiments, Θ includes a functional group such that after the leaving group is displaced and the remainder of Θ bonds to the polymer chain, a functional group is attached to the polymer. The functional group may have a desirable impact on filled rubber compositions as defined herein.

In one or more embodiments, addition groups include those substituents that will undergo an addition reaction with a nucleophilic compound. In one or more embodiments, the addition group will react or associate with the living anionic portion (e.g., —$C^-$) of a living polymer. In one or more embodiments, the addition groups include groups that will undergo a ring-opening reaction with a living polymer. In one or more embodiments, addition groups include nitrites such as cyano groups, alkyl or alkenyl nitrites, Schiff bases (e.g., RR'C=NR"), ketone groups, aldehyde groups, epoxy groups, (e.g. glycidyl ether), isocyanate groups, cyclic amides, cyclic imides, cyclic enamides, cyclic carbonates, or ester groups. In one or more embodiments, Θ includes functional group such that after the addition group adds to the polymer chain, a residue of the reaction provides a functional group that is attached to the polymer. The functional group may have a desirable impact on filled rubber compositions as defined herein.

Specific examples of functionalizing compounds useful in practicing this invention include tetrakis[2-(3,4-epoxycyclohexyl)ethyl-dimethylsiloxy], dimethyl-bis[2-(3,4-epoxycyclohexyl)ethyl-dimethylsiloxy], and methyl-tris[2-3,4-epoxycyclonexyl-dimethylsiloxy].

In one or more embodiments, living polymers include anionically polymerized polymers (i.e., polymers prepared by anionic polymerization techniques). Anionically-polymerized living polymers may be formed by reacting anionic initiators with certain unsaturated monomers to propagate a polymeric structure. Or, in other embodiments, other monomers such as epoxides or cyclic siloxanes, may be polymerized by anionic polymerization. Throughout formation and propagation of the polymer, the polymeric structure may be anionic and "living." A new batch of monomer subsequently added to the reaction can add to the living ends of the existing chains and increase the degree of polymerization. A living polymer, therefore, includes a polymeric segment having a living or reactive end. Anionic polymerization is further described in George Odian, *Principles of Polymerization*, ch. 5 ($3^{rd}$ Ed. 1991), or Panek, 94 J. Am. Chem. Soc., 8768 (1972), which are incorporated herein by reference.

Monomers that can be employed in preparing an anionically polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

In other embodiments, epoxides such as ethylene oxide or propylene oxide may be polymerized to form a living polymer. In yet other embodiments, cyclic siloxanes may be polymerized to form a living polymer.

Any anionic initiator can be employed to initiate the formation and propagation of the living polymers. Exemplary anionic initiators include, but are not limited to, alkyl lithium initiators such as n-butyl lithium, arenyllithium initiators, and arenylsodium initiators. In one or more embodiments, a functional initiator is employed. In one or more embodiments, functional initiators include those organometal compounds where the organo ligand includes one or more heteroatoms. For example, one class of functional initiators includes aminoalkyllithium compounds such as N-lithiohexamethyleneimide, N-lithiopyrrolidinide, and N-lithiododecamethyleneimide, as well as those disclosed in U.S. Pat. Nos. 5,332,810, 5,329,005, 5,578,542, 5,393,721, 5,698,646, 5,491,230, 5,521,309, 5,496,940, 5,574,109, 5,786,441, which are incorporated herein by reference. Other examples include tin-containing initiators such as alkyl tin lithiums including those disclosed in U.S. Pat. Nos. 3,426,006 and 5,268,439, which are incorporated herein by reference. Still others include alkylthioacetals (e.g. dithianes) and related compounds including those disclosed in U.S. Publications: 2006/0030657, 2006/0264590 and 2006/0264589, which are incorporated herein by reference. Still others include silica-containing initiators such as those described in U.S. Publication 2006/0241241, which is incorporated herein by reference.

The amount of initiator employed in conducting anionic polymerizations can vary widely based upon the desired polymer characteristics. In one or more embodiments, from about 0.1 to about 100, and optionally from about 0.33 to about 10 mmol of lithium per 100 g of monomer is employed.

Anionic polymerizations are typically conducted in a polar solvent such as tetrahydrofuran (THF) or a non-polar hydrocarbon such as the various cyclic and acyclic hexanes, heptanes, octanes, pentanes, their alkylated derivatives, and mixtures thereof, as well as benzene.

In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis(2'-tetrahydrofuryl)propane, di-piperidyl ethane, dipiperidyl methane, hexamethylphosphoramide, N—N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, incorporated herein by reference.

Anionically polymerized living polymers can be prepared by either batch or continuous methods. A batch polymerization is begun by charging a blend of monomer(s) and normal alkane solvent to a suitable reaction vessel, followed by the addition of the polar coordinator (if employed) and an initiator compound. The reactants are heated to a temperature of from about 20 to about 130° C. and the polymerization is allowed to proceed for from about 0.1 to about 24 hours. This reaction produces a reactive polymer having a reactive or living end. Preferably, at least about 30% of the polymer molecules contain a living end. More preferably, at least about 50% of the polymer molecules contain a living end. Even more preferably, at least about 80% contain a living end.

In one or more embodiments, the reaction between the functionalizing agent and the living polymer can be achieved by simply introducing the functionalizing compound with the living polymer. Without intending to be bound to any particular theory, it is believed that the anionic-living polymer reacts with the leaving group or addition group via a nucleophilic substitution or addition reaction.

In one embodiment, the functionalizing agent may be added to the living polymer cement (i.e., polymer and solvent) once a peak polymerization temperature, which is indicative of nearly complete monomer conversion, is observed. Because live ends may self-terminate, the functionalizing agent may be added within about 25 to 35 minutes of the peak polymerization temperature.

The amount of functionalizing agent employed to prepare the functional polymers can be described with respect to the equivalents of lithium or metal cation associated with the initiator, which can be related to the moles of living polymer (i.e., polymer anions). In one or more embodiments, the moles of functionalizing agent to lithium (or moles of polymer anion) can be from about 0.25:1 to about 10:1, in other embodiments from about 1:1 to about 5:1, and in other embodiments from about 1.2:1 to about 2:1. In one or more embodiments, a molar excess of functionalizing agent to lithium is employed.

After formation of the functional polymer, a processing aid and other optional additives such as oil and antioxidants can be added to the polymer cement. Also, after functionalizing the polymer, a quenching agent may be added in order to deactivate any residual active polymer, catalyst, or initiator. Quenching agents include protic compounds such as alcohols, water, and organic acids. The functional polymer and other optional ingredients may then be isolated from the solvent and optionally dried. Conventional procedures for desolventization and drying may be employed. In one embodiment, the functional polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

In one or more embodiments, the functionalizing agent employed in the present invention can be made by reacting a dialkylsiloxy silane with a multi-functional compound. The multi-functional compound includes at least one group capable of undergoing a hydrosilation reaction with the silane and one group capable of reacting with a living polymer. In one or more embodiments, the group capable of reacting with the silane through a hydrosilation reaction includes a vinyl group, an allylic group, or an amine group. In one or more embodiments, a group capable of reacting with a living polymer includes a leaving group or an addition group, (e.g. Θ). Types of multi-functional compounds include vinyl or allylic halides, epoxides, imides, enamides and the like.

The dialkylsiloxy silane may be defined by the formula

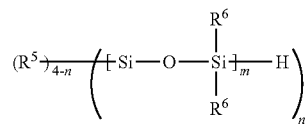

were $R^5$ is a monovalent organic group, each $R^6$ is independently a monovalent organic group, m is an integer from 1 to about 25, and n is an integer from 1 to 4. Specific examples of dialkyl siloxy silanes include tetrakis(dimethylsiloxy)silane, methyltris(dimethylsiloxy)silane, or dimethylbis(dimethylsiloxy)silane.

In one or more embodiments, the reaction between the dialkylsiloxy silane and the multi-functional compound may take place within a solvent at elevated temperatures in the presence of a catalyst. For example, polar and non-polar solvents may be used including toluene and/or THF. The reaction temperature may be from about 55° C. to about 110° C., or in other embodiments from about 60° C. to about 110° C., and the reaction may be allowed to proceed for 8 to about 24 hours. Useful catalysts include platinum based catalysts such as Karsteadt's catalyst, or rhodium based catalysts such as Wilkinson's catalyst. The resulting solutions may be from about 0.1 to about 1 molar solutions of functionalizing compound within the solvent.

Functional polymers of one or more embodiments of the present invention, which are particularly useful for preparing tire treads, may be defined by the formula

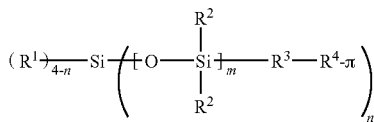

where $R^1$ is a monovalent organic group, each $R^2$ is independently a monovalent organic group, $R^3$ is a divalent organic group, $R^4$ is a bond, a divalent organic group, or a divalent organic group including a functional group, π is a polymer chain, m is an integer from 1 to about 25, and n is an integer from 1 to 4. In certain embodiments, m is an integer from 1 to about 12, in other embodiments from 1 to about 6, and in other embodiments from 1 to about 3. In these or other embodiments, n is an integer from 2 to 4, in other embodiments from 3 to 4, and in other embodiments 4.

In one or more embodiments, the polymer chain (π) of the functionalized polymer includes an unsaturated polymer. In one or more embodiments, the polymer chain includes those polymers that are capable of being vulcanized into a composition exhibiting elastomeric behavior. In these or other embodiments, the polymers include those prepared by polymerizing conjugated diene monomer optionally together with copolymerizable monomer such as vinyl aromatic monomer. The polymer chain substituent can have a glass transition temperature ($T_g$) that is less than 0° C., in other embodiments less than −20° C., and in other embodiments less than −30° C. In one embodiment, the polymer chain exhibits a single glass transition temperature. Exemplary polymers include anionically polymerized polymers. In these or other embodiments, examples include polybutadiene, polyisoprene, poly(styrene-co-butadiene), poly(styrene-co-butadiene-co-isoprene), poly(isoprene-co-styrene), and poly(butadiene-co-isoprene). The polymer chain may be referred to as a rubber or elastomer chain or polymer chain.

In other embodiments, the polymer chain (it) includes a polyether or a polysiloxane. Exemplary polyethers include polyalkyene oxides such as polyethylene oxide or polypropylene oxide. Exemplary polysiloxanes include polydimethylsiloxane (PDMS).

In one or more embodiments, the polymer chain has a number average molecular weight ($M_n$) of from about 5 to about 1,000 kg/mole, in other embodiments from about 50 to about 500 kg/mole, and in other embodiments from 100 to about 300 kg/mole, as measured by using Gel Permeation Chromatography (GPC) calibrated with polystyrene standards and adjusted for the Mark-Houwink constants for the polymer in question.

In one or more embodiments, the functionalized polymer may include a functional group at the head of the polymer; i.e., at an end other than that including the silica functionality. This functionalized polymer can be defined by the formula II

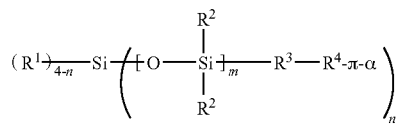

where $R^1$ is a monovalent organic group, each $R^2$ is independently a monovalent organic group, $R^3$ is a divalent organic group, $R^4$ is a bond, a divalent organic group, or a divalent organic group including a functional group, π is a polymer chain, α includes a functional group, and n is an integer from 1 to 4.

In one or more embodiments, α is a functionality or functional group that has a desirable impact on filled rubber compositions or vulcanizates. In one or more embodiments, these groups include those groups or substituents that react or interact with rubber or fillers employed in rubber compositions. In one or more embodiments, functional groups include those substituents that reduce the 50° C. hysteresis loss of a carbon black-filled vulcanizate as compared to similar carbon black-filled vulcanizates without the functional group. In one or more embodiments, this reduction in hysteresis loss is at least 5%, in other embodiments at least 10%, and in other embodiments at least 15%. In other embodiments, functional groups include those groups that will have a similar impact on silica-filled or mixed carbon black/silica-filled compositions. In one or more embodiments, the functional groups include a hetero atom. These hetero atom-bearing substituents include those that may generally be characterized as an electron rich species or metal-containing species. Functional groups include those substituents that react or interact with rubber or rubber fillers or otherwise have a desirable impact on filled rubber compositions or vulcanizates.

Numerous functional groups are known in the art. Exemplary functional groups include tin-containing groups, nitrogen-containing groups, silicone-containing groups, and sulfur-containing groups. These functional groups derive from or may be the residue of a functional initiator as described above. Exemplary tin-containing groups include trialkyltin groups such as tributyl tin and trioctyltin groups. Exemplary nitrogen-containing groups include cyclic amine groups such as hexamethyleneimine groups, pyrollidine groups, and aziridine groups. Exemplary sulfur-containing groups include sulfur-containing azaheterocycle groups, and dithiane groups. Exemplary silicon-containing groups include alkoxysilane groups.

The functional polymers of this invention are particularly useful in preparing tire components. These tire components can be prepared by using the functionalized polymers of this invention alone or together with other rubbery polymers. Other rubbery polymers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof. Silica (silicon dioxide) includes wet-process, hydrated silica produced by a chemical reaction in water, and precipitated as ultra-fine spherical particles. In one embodiment, the silica has a surface area of about 32 to about 400 m$^2$/g, in another embodiment about 100 to about 250 m$^2$/g, and in yet another embodiment, about 150 to about 220 m$^2$/g. The pH of the silica filler in one embodiment is about 5.5 to about 7 and in another embodiment about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165MP and 175GRPlus (Rhodia), Vulkasil™ S/kg (Bary AG), Ultrasil™ VN2, VN3 (Degussa), and HuberSil™ 8745 (Huber).

In one embodiment, silica may be used in an amount of from about 5 to about 100 parts by weight parts per hundred rubber (phr), in another embodiment from about 10 to about 90 parts by weight phr, in yet another embodiment from about 15 to about 80 parts by weight phr, and in still another embodiment from about 25 to about 75 parts by weight phr.

A multitude of rubber curing agents may be employed, including sulfur or peroxide-based curing systems. Curing agents are described in Kirk-Othmer, ENCYCLOPEDIA OF CHEMICAL TECHNOLOGY, Vol. 20, pgs. 365-468, (3$^{rd}$ Ed. 1982), particularly Vulcanization Agents and Auxiliary Materials, pgs. 390-402, and A. Y. Coran, Vulcanization, ENCYCLOPEDIA OF POLYMER SCIENCE AND ENGINEERING, (2$^{nd}$ Ed. 1989), which are incorporated herein by reference. Vulcanizing agents may be used alone or in combination. In one or more embodiments, the preparation of vulcanizable compositions and the construction and curing of the tire is not affected by the practice of this invention.

Other ingredients that may be employed include accelerators, oils, black oils, waxes, scorch inhibiting agents, processing aids, zinc oxide, tackifying resins, reinforcing resins, fatty acids such as stearic acid, peptizers, and one or more additional rubbers.

These stocks are useful for forming tire components such as treads, subtreads, black sidewalls, body ply skins, bead filler, and the like. Preferably, the functional polymers are employed in tread formulations. In one or more embodiments, these tread formulations may include from about 10 to about 100% by weight, in other embodiments from about 35 to about 90% by weight, and in other embodiments from about 50 to 80% by weight of the functional polymer based on the total weight of the rubber within the formulation.

In one or more embodiments, the vulcanizable rubber composition may be prepared by forming an initial masterbatch that includes the rubber component and filler (the rubber component optionally including the functionalized polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the functionalized polymer of this invention can be added during these remills. Rubber compounding techniques and the additives employed therein are generally known as disclosed in The Compounding and Vulcanization of Rubber, in Rubber Technology (2$^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized polymer of this invention and silica in the substantial absence of coupling and shielding agents. It is believed that this procedure will enhance the opportunity that the functionalized polymer will react or interact with silica before competing with coupling or shielding agents, which can be added later curing remills.

In certain embodiments, where silica filler is employed to make the rubber compositions, the compositions are prepared by mixing the functionalized polymer and silica in the presence of a nitrogen-containing heterocycle. The nitrogen-containing heterocycle is believed to enhance the reaction or interaction between the silica and the functional polymer.

In one or more embodiments, nitrogen-containing heterocycles include substituted and unsubstituted nitrogen-containing heterocycles. The nitrogen-containing heterocycle may be aromatic or non-aromatic. Nitrogen-containing heterocycles may include compounds defined by the formula

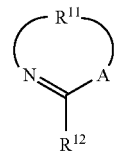

where A includes oxygen, sulfur, or N—R$^{13}$, R$^{11}$ includes a divalent organic group, R$^{12}$ and R$^{13}$ independently include a hydrogen atom or a monovalent organic group, or where any two or more of R$^{11}$, R$^{12}$, and R$^{13}$ combine to form a multivalent organic group, which results in a multicyclic compound. In one embodiment, A is nitrogen. In this or other embodiments, the nitrogen-containing heterocycle includes a nitrogen-containing ring having from 5 to 9 ring members (i.e., 5 to 9 atoms in the ring). In one embodiment, the ring has 5 ring members. Nitrogen-containing heterocycles are further described in co-pending U.S. application Ser. No. 11/259, 485, which is incorporated herein by reference.

In one or more embodiments, nitrogen-containing heterocycles include imidazoles, pyrimidines, thiazoles, thiazolines, histadine, purines, adenines, and guanines.

In one embodiment, the nitrogen-containing heterocycle is a substituted or unsubstituted imidazole, which may be represented by the formula

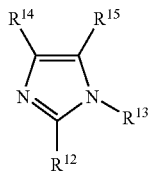

where $R^{12}$, and $R^{13}$ are as described above, and $R^{14}$ and $R^{15}$ independently include a hydrogen atom or a monovalent organic group, or where any two or more of $R^{12}$, $R^{13}$, $R^{14}$, or $R^{15}$ combine to form a multivalent organic group, which results in a multicyclic compound.

Examples of imidazoles include imidazole, 4-ethylamino imidazole, 2-mercapto-1-methyl imidazole, 1-methyl imidazole, 2,4,5-triphenyl imidazole, 2-methyl imidazole, 2-ethyl-4-methyl imidazole, and 2-heptadecyl imidazole.

The amount of nitrogen-containing heterocycle employed is not particularly limited, but is, in one embodiment, from about 0.005 to about 8 percent by weight based on the weight of the functional polymer, in another embodiment, from about 0.05 to about 5 percent by weight based on the weight of the functional polymer, in yet another embodiment, from about 0.01 to about 3 percent by weight based on the weight of the functional polymer, and in still another embodiment, from about 0.1 to about 2 percent by weight based on the weight of the functional polymer.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

A solution of 32.9 g (0.1 mol) of tetrakis(dimethylsiloxy) silane (TDMSiH4) and 49.6 g (0.4 mol) of 3-vinyl-7-oxabicyclo[4.1.0]heptane (VCHO), 7 mg ($7 \times 10^{-6}$ mol) RhCl (Ph$_3$P)$_3$ in 10 ml dry toluene were placed in a 250 ml round-bottom flask equipped with a magnetic stir bar and a reflux condenser. The reaction mixture was heated at 85-90° C. for 24 h. The progress of the hydrosilation reaction was followed by $^1$H-NMR in CDCl$_3$ by monitoring of the disappearance of the vinyl groups of VCHO and the Si—H singlet peak at 4.6-4.7 ppm of TDMSiH4. The toluene and excess epoxy starting material were removed under vacuum. The product (tetrakis[2-(3,4-epoxycyclohexyl)ethyl-dimethylsiloxy]) TDMSi—CHE4]] was obtained at the yield >95%.

Example 2

To a 38 liter reactor equipped with turbine agitator blades was added 3.03 kg hexane, 1.20 kg 34.0 wt % styrene in hexane, and 7.06 kg 22.6 wt % butadiene in hexane. To the reactor was charged 8.27 ml of 1.60 M butyl lithium in hexane and 4.07 ml of 1.6 M 2,2'-di(tetrahydrofuryl)propane in hexane and the batch temperature was controlled at 49° C. After approximately 1 hour, the batch was cooled to 32° C. and a measured amount of live poly(styrene-co-butadiene) cement was then transferred to a sealed nitrogen purged 0.8 Liter bottle. The bottle contents were then terminated with isopropanol, coagulated and drum dried. The isolated polymer had the following properties: $M_n$=143 kg/mol, MWD=1.04, $T_g$=−32.0° C., Percent Styrene 22.5%, Percent Vinyl=51.0%.

Example 3

Approximately 400 g of cement was transferred from the 38 liter reactor used in Example 2 into seven different 0.8 liter nitrogen purged bottles. To each bottle was respectively added either SiCl$_4$, or SnCl$_4$, or TDMSi—CHE4 in various molar ratio to butyl lithium as set forth in Table I. The bottles were rotated for 1 hour in a 50° C. bath, then the contents were coagulated in isopropanol and drum dried. Table I also provides the molecular weight of the functionalized polymer, the percent functionalization, the glass transition temperature ($T_g$), and the Mooney Viscosity of the functional polymer.

TABLE I

| | Sample | | | | | | |
|---|---|---|---|---|---|---|---|
| | 1 | 2 | 3 | 4 | 5 | 6 | 7 |
| Terminator | Example 1 | Example 1 | Example 1 | Example 1 | Example 1 | SnCl$_4$ | SiCl$_4$ |
| Molar Ratio (Terminator:BuLi) | 0.2:1 | 0.25:1 | 0.33:1 | 0.5:1 | 1:1 | 0.2:1 | 0.2:1 |
| Coupled Molecular Weight ($M_n$)(Kg/mol) | 4.43 | 4.41 | 4.37 | 4.32 | 4.16 | 5.35 | 5.14 |
| Percent Coupling (%) | 55 | 59 | 60 | 52 | 42 | 74 | 76 |
| $T_g$ (° C.) | −32.3 | −32.0 | −31.7 | −31.7 | −31.6 | −31.9 | −31.5 |
| Mooney) (ML$_{(1+4)}$ @ 100° C.) | 70.3 | 79.4 | 80.6 | 72.9 | 62.9 | 96.1 | 94.6 |

Tread Formulations 1A-7A

A portion of the functional polymers prepared in Example 3 above (i.e., Samples 1-7) were each employed to prepare separate tire formulations that included a silica and carbon black blend reinforcement. The recipe for the tire formulations is set forth in Table II.

TABLE II

| Ingredient | Formulation (phr) |
|---|---|
| Functional Polymer | 100 |
| Carbon Black | 27 |
| Silica | 24.5 |
| Antiozonant | 0.95 |
| Stearic Acid | 2 |
| Wax | 2 |
| Black Oil | 10 |
| Coupling Agent | 2.5 |
| Silica | 2.5 |
| Sulfur | 1.5 |
| Zinc Oxide | 2.5 |
| Accelerators | 1.8 |
| Scorch Inhibitor | 0.7 |

The tire formulations were mixed using conventional carbon black/silica formulation mixing procedures. Namely, the ingredients (excluding sulfur, accelerators, additional silica, coupling agents, and zinc oxide) were mixed to a drop temperature of about 168° C. Then, the coupling agent was subsequently added together with the additional silica and mixed to a drop temperature of about 145° C. Then, the sulfur, accelerators, scorch inhibitors, and zinc oxide were added in a subsequent mixing step and mixed to a drop temperature of about 95° C.

The formulations were then prepared into test specimens and cured within a closed cavity mold under pressure for 15 minutes at 171° C. The test specimens were then subjected to various physical tests, and the results of these tests are reported in Table III as Formulations 1A-7A.

TABLE IV

| Ingredient | Formulation (phr) |
|---|---|
| Functional Polymer | 80 |
| Natural Rubber | 20 |
| Silica | 52.5 |
| Wax | 2 |
| Antiozonant | 0.95 |
| Stearic Acid | 2 |
| Black Oil | 10 |
| Silica | 2.5 |
| Coupling Agent | 5 |
| Zinc Oxide | 2.5 |
| Sulfur | 1.5 |
| Accelerators | 2.7 |
| Scorch Inhibitors | 1.4 |

The tire formulations were mixed using conventional silica formulation mixing procedures. Namely, the ingredients (excluding sulfur, accelerators, additional silica, coupling agents, and zinc oxide) were mixed to a drop temperature of about 168° C. Then, the coupling agent was subsequently added together with the additional silica and mixed to a drop temperature of about 145° C. Then, the sulfur, accelerators, scorch inhibitors, and zinc oxide were added in a subsequent mixing step and mixed to a drop temperature of about 95° C.

The formulations were then prepared into test specimens and cured within a closed cavity mold under pressure for 15 minutes at 171° C. The test specimens were then subjected to various physical tests, and the results of these tests are reported in Table V as Formulations 1B-7B.

TABLE III

| | Tread Formulations | | | | | | |
|---|---|---|---|---|---|---|---|
| | 1A | 2A | 3A | 4A | 5A | 6A | 7A |
| Compound Mooney $ML_{(1+4)}$ @ 100° C. | 114.0 | 115.5 | 115.2 | 110.7 | 104.5 | 101.9 | — |
| 50% Modulus @ 23° C. (MPa) | 1.944 | 1.967 | 1.928 | 1.845 | 1.895 | 1.949 | — |
| 300% Modulus @ 23° C. (MPa) | 11.63 | 12.01 | 11.419 | 11.12 | 11.51 | 10.94 | — |
| Tensile @ Break @ 23° C. (MPa) | 15.31 | 14.97 | 13.20 | 16.45 | 15.55 | 16.08 | — |
| Elongation @ Break 23° C. (MPa) | 379.6 | 361.5 | 337.9 | 419.9 | 388.7 | 419.4 | — |
| Toughness (MPa) | 27.43 | 25.54 | 21.37 | 32.52 | 29.29 | 32.24 | — |
| tan δ @ 60° C. | 0.115 | 0.110 | 0.114 | 0.110 | 0.109 | 0.120 | — |
| tan δ @ 0° C. | 0.486 | 0.482 | 0.487 | 0.520 | 0.520 | 0.487 | — |

Tread Formulations 1B-7B

A portion of the functional polymers prepared in Example 3 (i.e., Samples 1-7) above were each employed to prepare separate tire formulations that included a silica reinforcement. The recipe for the tire formulations are is forth in Table IV.

TABLE V

| | Tread Formulations | | | | | | |
|---|---|---|---|---|---|---|---|
| | 1B | 2B | 3B | 4B | 5B | 6B | 7B |
| Compound Mooney $ML_{(1+4)}$ @ 130° C. | 85.1 | 86.3 | 87.5 | 84.7 | 73.9 | 87.1 | 105.6 |
| tan δ @ 60° C. | 0.078 | 0.072 | 0.073 | 0.074 | 0.070 | 0.090 | 0.087 |
| tan δ @ 0° C. | 0.400 | 0.422 | 0.415 | 0.421 | 0.452 | 0.336 | 0.325 |

Mooney viscosity measurement was conducted at 100° C. using a large rotor. The Mooney viscosity was recorded as the torque when the rotor has rotated for 4 minutes. The sample is preheated at 100° C. for 1 minute before the rotor starts.

The tensile mechanical properties were measured using the standard procedure described in the ASTM-D 412 at 25° C. and 100° C. The tensile test specimens had dumbbell shapes with a thickness of 1.9 mm. A specific gauge length of 25.4 mm is used for the tensile test. Heat aged data was obtained after heating the vulcanizates for 24 hours at 100° C.

Tan δ at 0° C., 30° C., and 60° C. were determined by using a Dynastat analyzer operating at 10 HZ, with 2 kg static load and 1.25 kg dynamic load.

Example 4

A solution of 32.9 g (0.1 mol) of dimethyl-bis(dimethylsiloxy)silane (DBDMSiH2) and 49.6 g (0.4 mol) of 3-vinyl-7-oxabicyclo[4.1.0]heptane (VCHO), 7 mg ($7 \times 10^{-6}$ mol) RhCl $(Ph_3P)_3$ in 10 ml dry toluene were placed in a 250 ml round-bottom flask equipped with a magnetic stir bar and a reflux condenser. The reaction mixture was heated at 85-90° C. for 24 h. The progress of the hydrosilation reaction was followed by $^1$H-NMR in $CDCl_3$ by monitoring of the disappearance of the vinyl groups of VCHO and the Si—H singlet peak at 4.6-4.7 ppm of TDMSiH4. The toluene and excess epoxy starting material were removed under vacuum. The product (dimethyl-bis[2-(3,4-epoxycyclohexyl)ethyl-dimethylsiloxy] (DBDMS; -CHE2)) was obtained at the yield >95%.

Example 5

A solution of 32.9 g (0.1 mol) of methyl-tris(dimethylsiloxy)silane (MTDMSiH3) and 49.6 g (0.4 mol) of 3-vinyl-7-oxabicyclo[4.1.0]heptane (VCHO), 7 mg ($7 \times 10^{-6}$ mol) RhCl $(Ph_3P)_3$ in 10 ml dry toluene were placed in a 250 ml round-bottom flask equipped with a magnetic stir bar and a reflux condenser. The reaction mixture was heated at 85-90° C. for 24 h. The progress of the hydrosilation reaction was followed by $^1$H-NMR in $CDCl_3$ by monitoring of the disappearance of the vinyl groups of VCHO and the Si—H singlet peak at 4.6-4.7 ppm of TDMSiH4. The toluene and excess epoxy starting material were removed under vacuum. The product (methyl-tris[2-3,4-epoxycyclonexyl-dimethylsiloxy] (MT-DMSi-CHE3)) was obtained at the yield >95%.

Example 6

Using procedures similar to that set forth in Example 2, a living polymer, a functional polymer was prepared that was characterized by an Mn=1.25 kg/mol, MWD=1.07, Tg –27° C., styrene 25%, and vinyl 60%.

Example 7

Portions of the polymer prepared in Example 6 was fractioned into five bottles and terminated in a similar fashion as provided in Example 3. Table VI sets forth the terminator that was reacted with each sample, the molar ratio to butyllithium employed, the molecular weight of the functionalized polymer, the percent functionalization, the glass transition temperature, and the Mooney Viscosity of the functional polymer.

TABLE VI

| | Sample | | | | |
|---|---|---|---|---|---|
| | 8 | 9 | 10 | 11 | 12 |
| Terminator | Example 4 | Example 5 | Example 1 | $SiCl_4$ | $SnCl_4$ |
| Molar Ratio (Terminator:BuLi) | 1:2 | 1:3 | 1:4 | 1:4 | 1:4 |
| Coupled Molecular Weight $(M_n)$(Kg/mol) | 2.61 | 3.50 | 3.58 | 4.13 | 4.31 |
| Percent Coupling (%) | 71 | 78 | 66 | 86 | 83 |
| $T_g$ (° C.) | −26.6 | −27.1 | −27.3 | −27.0 | −28.0 |
| Mooney) ($ML_{(1+4)}$ @ 100° C.) | 85.9 | 83.3 | 73.9 | 92.5 | 89.7 |

Tread Formulations 8A-12A

Following the procedures and recipes as set forth in tread formulations 1A-8A above, a portion of the functional polymers prepared in Example 8 above (i.e., Samples 8-12) were each employed to prepare separate tire formulations that included a silica and carbon black blend reinforcement. The vulcanizates were subjected to various physical tests, and results of these tests are reported in Table VII as formulations 8A-12A.

TABLE VII

| | Tread Formulations | | | | |
|---|---|---|---|---|---|
| | 8A | 9A | 10A | 11A | 12A |
| Compound Mooney $ML_{(1+4)}$ @ 130° C. | 108.1 | 104.4 | 94.8 | 108.5 | 85.8 |
| tan δ @ 60° C. | 0.129 | 0.127 | 0.121 | 0.136 | 0.124 |
| tan δ @ 0° C. | 0.601 | 0.613 | 0.641 | 0.542 | 0.629 |
| tan δ @ 30° C. | 0.200 | 0.200 | 0.191 | 0.202 | 0.193 |

Tread Formulations 8B-12B

Following the procedures and recipes as set forth in tread formulations 1B-8B above, a portion of the functional polymers prepared in Example 8 above (i.e., Samples 8-12) were each employed to prepare separate tire formulations that included a silica reinforcement. The vulcanizates were subjected to various physical tests, and results of these tests are reported in Table VIII as formulations 8B-12B.

TABLE VIII

|  | Tread Formulations | | | | |
| --- | --- | --- | --- | --- | --- |
|  | 8B | 9B | 10B | 11B | 12B |
| Compound Mooney $ML_{(1+4)}$ @ 130° C. | 83.1 | 76.4 | 70.4 | 84.0 | 70.7 |
| tan δ @ 60° C. | 0.0915 | 0.901 | 0.0846 | 0.0953 | 0.102 |
| tan δ @ 0° C. | 0.482 | 0.477 | 0.589 | 0.417 | 0.465 |
| tan δ @ 30° C. | 0.147 | 0.146 | 0.139 | 0.146 | 0.144 |

Tread Formulations 8C-12C

A portion of the functional polymers prepared in Example 8 above (i.e., Samples 8-12) were each employed to prepare separate tire formulations that included a carbon black reinforcement. The recipe for the tire formulations are reported in Table IX.

TABLE IX

| Ingredient | Formulation (phr) |
| --- | --- |
| Functionalized Polymer | 100 |
| Carbon Black | 50 |
| Wax | 2 |
| Antiozonant | 0.95 |
| Stearic Acid | 2.0 |
| Black Oil | 10 |
| Zinc Oxide | 2.5 |
| Sulfur | 1.5 |
| Accelerators | 1.0 |
| Scorch Inhibitor | 0.3 |

The tire formulations were mixed using conventional carbon black formulation mixing procedures. Namely, the ingredients (excluding sulfur, accelerators) were mixed to a drop temperature of about 165° C. Then, the sulfur, and accelerators were added in a subsequent mixing step and mixed to a drop temperature of about 100° C.

The formulations were then prepared into test specimens and cured within a closed cavity mold under pressure for 15 minutes at 171° C. The test specimens were then subjected to various physical tests, and the results of these tests are reported in Table X as Formulations 8C-12C.

TABLE X

|  | Tread Formulations | | | | |
| --- | --- | --- | --- | --- | --- |
|  | 8C | 9C | 10C | 11C | 12C |
| Compound Mooney $ML_{(1+4)}$ @ 130° C. | 107.7 | 102.1 | 92.6 | 105.8 | 88.7 |
| tan δ @ 60° C. | 0.139 | 0.158 | 0.165 | 0.161 | 0.127 |
| tan δ @ 0° C. | 0.691 | 0.606 | 0.614 | 0.604 | 0.727 |
| Tan δ @ 30° C. | 0.197 | 0.220 | 0.223 | 0.225 | 0.183 |

This data further establishes that the functional polymer of the present invention is advantageous in silica-containing rubber compositions as evidenced by the advantageous properties where silica is present (i.e. previous examples) and little to no advantage in compounds that do not contain silica (e.g. 8C-12C).

Example 8

Following the procedure set forth in Example 2 above, living polymer was prepared except that hexamethyleneimine (HMI) was added to the reactor prior to the addition of the butyl lithium. The amount of HMI was 0.5 moles of HMI to one mole of butyl lithium employed. The resultant living polymer was believed to include a cyclic amine functional group at the head of the polymer chain.

Example 9

Following the procedure set forth in Example 3 above, four fractions of the functional polymer prepared in Example 8 above were terminated with TDMSi—CHE4. The molar ratio of TDMSi—CHE4 to lithium charged for each fraction (samples 13-16) is provided in Table XI along with characteristics of the polymer.

TABLE XI

|  | Sample | | | |
| --- | --- | --- | --- | --- |
|  | 13 | 14 | 15 | 16 |
| Molar Ratio (Terminator:BuLi) | 1:1 | 0.5:1 | 0.33:1 | 0.25:1 |
| Coupled Molecular Weight ($M_n$)(Kg/mol) | 3.15 | 3.32 | 4.05 | 4.16 |
| Percent Coupling (%) | 24 | 38 | 47 | 51 |
| $T_g$ (° C.) | −35.42 | −35.24 | −35.45 | −35.34 |
| Mooney) $(ML_{(1+4)}$ @ 100° C.) | 52.5 | 64.7 | 69.6 | 78.9 |

A portion of the functional polymers prepared in Example 9 (i.e., Samples 13-16) above were each employed to prepare separate tire formulations that included a silica reinforcement. The recipe for the tire formulations were the same as that set forth in Table IV. The preparation of the tire formulations and ultimate preparation of vulcanizates therefrom took place using procedures similar to those provided from Formulations 1A-74. The vulcanizates were similarly tested for mechanical and dynamic properties, and the results of this testing is set forth in Table XII. Sample 17A represents a control prepared using a polymer similarly initiated (i.e. HMI) and coupled with tin tetrachloride.

TABLE XII

| | Tread Formulations | | | | |
|---|---|---|---|---|---|
| | 13A | 14A | 15A | 16A | 17A |
| Compound Mooney ML$_{(1+4)}$ @ 130° C. | 68.3 | 76.6 | 84.4 | 67.3 | 54.8 |
| 50% Modulus @ 23° C. (MPa) | 1.51 | 1.42 | 1.45 | 1.49 | 1.59 |
| 300% Modulus @ 23° C. (MPa) | 12.71 | 12.62 | 13.80 | 14.30 | 12.47 |
| Tensile @ Break @ 23° C. (MPa) | 15.89 | 16.46 | 16.06 | 16.87 | 17.17 |
| Elongation @ Break 23° C. (MPa) | 358.2 | 368.6 | 337.4 | 341.4 | 387.3 |
| Toughness (MPa) | 25.01 | 26.18 | 23.18 | 24.59 | 29.57 |
| tan δ @ 50° C. | 0.169 | 0.157 | 0.153 | 0.148 | 0.173 |

Various modifications and alterations that do not depart from the scope and spirit of this invention will become apparent to those skilled in the art. This invention is not to be duly limited to the illustrative embodiments set forth herein.

What is claimed is:

1. A polymer including a functional group, where the polymer is defined by the formula

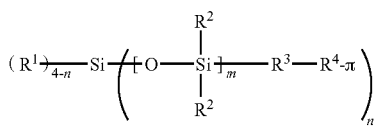

where $R^1$ is a monovalent organic group, each $R^2$ is independently a monovalent organic group, $R^3$ is a divalent organic group, $R^4$ is a bond, a divalent organic group, or a divalent organic group including a functional group, π is an anionically-polymerized unsaturated polymer chain, m is an integer from 1 to about 25, and n is an integer from 3 to 4.

2. The polymer of claim 1, where π derives from the polymerization of a conjugated diene monomer or conjugated diene and a vinyl aromatic monomer.

3. The polymer of claim 1, where π includes a functional group.

4. The polymer of claim 1, where the polymer is prepared by preparing a living polymer by employing anionic polymerization techniques; introducing the living polymer to a functionalizing agent and allowing the living polymer to react with the functionalizing agent, where the functionalizing agent is defined by the formula

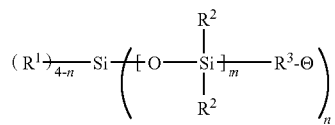

where $R^1$ is a monovalent organic group, each $R^2$ is independently a monovalent organic group, $R^3$ is a divalent organic group, Θ is a group that will react with a living polymer, m is an integer from 1 to about 25, and n is an integer from 3 to 4.

5. The polymer of claim 4, where the functionalizing agent is selected from the group consisting of dimethyl-bis[2-(3,4-epoxycyclohexyl)ethyl-dimethylsiloxy], methyl-tris[2-3,4-epoxycyclonexyl-dimethylsiloxy], and tetrakis[2-[(3,4-epoxycyclohexyl)ethyl-dimethylsiloxy].

6. The polymer of claim 1, where π is a polymer having a glass transition temperature that is less than 0° C.

7. The polymer of claim 1, where π has a number average molecular weight of about 5 to about 1000 kg/mole.

8. The polymer of claim 1, where π is a styrene-butadiene copolymer.

9. A polymer including a functional group, where the polymer is defined by the formula

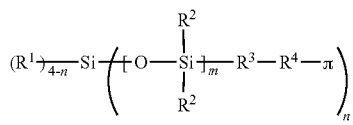

where $R^1$ is a monovalent organic group, each $R^2$ is independently a monovalent organic group, $R^3$ is a divalent organic group, $R^4$ is a bond, a divalent organic group, or a divalent organic group including a functional group, π is a copolymer of conjugated diene and a vinyl aromatic monomer and has a number average molecular weight of about 5 to about 1000 kg/mole, m is an integer from 1 to about 25, and n is an integer from 2 to 4.

10. A polymer including a functional group, where the polymer is defined by the formula

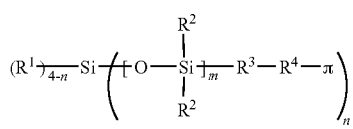

where $R^1$ is a monovalent alkyl, cycloalkyl, substituted cycloalkyl, alkenyl, cycloalkenyl, substituted cycloalkenyl, aryl, allyl, substituted aryl, aralkyl, alkaryl, or alkynyl group, each $R^2$ is independently a monovalent alkyl, cycloalkyl, substituted cycloalkyl, alkenyl, cycloalkenyl, substituted cycloalkenyl, aryl, allyl, substituted aryl, aralkyl, alkaryl, or alkynyl group, $R^3$ is a divalent alkylene, cycloalkylene, substituted alkylene, substituted cycloalkylene, alkenylene, cycloalkenylene, substituted alkenylene, substituted cycloalkenylene, arylene, or substituted arylene group, $R^4$ is a bond, a divalent alkylene, cycloalkylene, substituted alkylene, substituted cycloalkylene, alkenylene, cycloalkenylene, substituted alkenylene, substituted cycloalkenylene, arylene, or substituted arylene group, π is polymer chain that derives from the anionic polymerization of a conjugated diene polymer or a conjugated diene and a vinyl aromatic monomer, m is an integer from 1 to about 25, and n is an integer from 2 to 4.

11. The polymer of claim 10, where π is a polymer having a glass transition temperature that is less than 0° C.

12. The polymer of claim 10, where π has a number average molecular weight of about 5 to about 1000 kg/mole.

13. The polymer of claim 10, where n is an integer from 3 to 4.

14. The polymer of claim 10, where n is 4.

15. The polymer of claim 1, where m is an integer from 1 to 12.

16. The polymer of claim 1, where m is an integer from 1 to 6.

17. The polymer of claim 1, where m is an integer from 1 to 3.

18. A rubber vulcanizate comprising:
   i. the crosslinked product of a rubber polymer defined by the formula I:

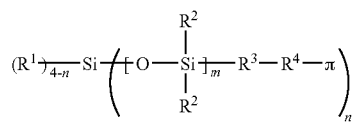

where $R^1$ is a monovalent organic group, each $R^2$ is independently a monovalent organic group, $R^3$ is a divalent organic group, $R^4$ is a bond, a divalent organic group, or a divalent organic group including a functional group, π is an anionically-polymerized unsaturated polymer chain having a number average molecular weight of 50 to 500 kg/mole, m is an integer from 1 to about 25, and n is an integer from 2 to 4; and
   ii. 50 to 100 parts by weight silica per 100 parts by weight rubber dispersed throughout the crosslinked product.

19. The composition of claim 18, further comprising a nitrogen-containing heterocycle.

20. The vulcanizate of claim 18, wherein the polymer chain is rubber or elastomer.

21. The vulcanizate of claim 18, where the polymer chain derives from the polymerization of a conjugated diene monomer or conjugated diene and a vinyl aromatic monomer.

22. The vulcanizate of claim 18, where the polymer chain is styrene-butadiene copolymer.

23. The vulcanizate of claim 18, where $R^3$ is a monovalent organic group selected from the group consisting of alkyl, cycloalkyl, substituted cycloalkyl, alkenyl, cycloalkenyl, substituted cycloalkenyl, aryl, allyl, substituted aryl, aralkyl, alkaryl, and alkynyl groups, and where $R^4$ is a bond or a monovalent organic group selected from the group consisting of alkyl, cycloalkyl, substituted cycloalkyl, alkenyl, cycloalkenyl, substituted cycloalkenyl, aryl, allyl, substituted aryl, aralkyl, alkaryl, and alkynyl groups.

24. The vulcanizate of claim 18, where the vulcanizate further includes the crosslinked product of a rubber other than that defined by the formula I, and where the vulcanizate includes from about 35 to 90% by weight of the rubber defined by the formula I.

* * * * *